United States Patent
Manni et al.

(10) Patent No.: US 7,194,689 B2
(45) Date of Patent: Mar. 20, 2007

(54) GENERIC USER CONTROL POINT TOOL FOR UNIVERSAL PLUG AND PLAY (UPNP) DEVICES

(75) Inventors: Sarat C. Manni, Redmond, WA (US); Bama Ramarathnam, Sammamish, WA (US); Mahesh G. Keni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 09/867,303

(22) Filed: May 29, 2001

(65) Prior Publication Data

US 2002/0027569 A1    Mar. 7, 2002

Related U.S. Application Data

(60) Provisional application No. 60/226,989, filed on Aug. 22, 2000.

(51) Int. Cl.
*G06F 15/177* (2006.01)

(52) U.S. Cl. ............. 715/735; 715/738; 715/780; 709/223

(58) Field of Classification Search ......... 345/734, 345/735, 736, 740, 741; 709/223, 211, 220, 709/221, 222, 224, 225, 226, 227; 715/733, 715/737, 738, 739, 742, 760, 780, 825, 826, 715/828, 968, 969
See application file for complete search history.

(56) References Cited

U.S. PATENT DOCUMENTS 5,548,722 A * 8/1996 Jalalian et al. ............. 709/220
5,901,286 A * 5/1999 Danknick et al. ........... 709/203
6,148,241 A * 11/2000 Ludtke et al. ............... 700/83
6,272,537 B1 * 8/2001 Kekic et al. ................ 709/223
6,603,488 B2 * 8/2003 Humpleman et al. ....... 345/771
7,107,226 B1 * 9/2006 Cassidy et al. .............. 705/26

OTHER PUBLICATIONS

Microsoft Word 2000. Copyright 1983-1999. Microsoft Corporation.*
Universal Plug and Play Device Architecture at http://www.upnp.org/download/UPnPDA10__20000613.htm (last visited Nov. 2, 2000).

* cited by examiner

*Primary Examiner*—Tadesse Hailu
(74) *Attorney, Agent, or Firm*—Workman Nydegger

(57) ABSTRACT

A user control point tool allows generic discovery, control, and display of Universal Plug and Play devices from a common user interface. This generic UCP tool provides a common user experience for all UPnP devices, regardless of their individual manufacturers. The generic UCP tool allows discovery of UPnP devices by type, by unique device name, or asynchronously. The user may select one of the discovered devices, view its properties, and select one of the services provided for that device to control. Additional information from a service description document may be viewed, and a user may query the value of the state variables and invoke an action for a service for the selected UPnP device. The results of the action are displayed on the tool's UI, as is the eventing information for the UPnP device. Status information for operation of the generic UCP tool itself is also provided.

31 Claims, 4 Drawing Sheets

GENERIC USER CONTROL POINT TOOL FOR UNIVERSAL PLUG AND PLAY (UPNP) DEVICES

RELATED APPLICATION

This application is related to U.S. Provisional Application Ser. No. 60/226,989, filed Aug. 22, 2000, the teachings and disclosure of which are hereby incorporated in their entirety by reference thereto.

TECHNICAL FIELD

This invention relates generally to the discovery and control of Universal Plug and Play (UPnP) devices, and more particularly, to a generic tool capable of discovering, retrieving the description, viewing events, and controlling any UPnP device present in the network.

BACKGROUND OF THE INVENTION

As described in the Universal Plug and Play Device Architecture document, the teachings and disclosure of which are hereby incorporated in their entirety by reference thereto, Universal Plug and Play (UPnP) is an architecture for pervasive peer-to-peer network connectivity of intelligent appliances, wireless devices, and personal computers (PCs) of all form factors. It is designed to bring easy-to-use, flexible, standards-based connectivity to ad-hoc or unmanaged networks whether in the home, in a small business, public spaces, or attached to the Internet. Universal Plug and Play is a distributed, open networking architecture that leverages Transmission Control Protocol/Internet Protocol (TCP/IP) and the Web technologies to enable seamless proximity networking in addition to control and data transfer among networked devices in the home, office, and public spaces. UPnP is more than just a simple extension of the plug and play peripheral model. It is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices. Dynamic Host Configuration Protocol (DHCP) and Domain Name System (DNS) servers are optional and are used only if available on the network. Finally, a device can leave a network smoothly and automatically without leaving any unwanted state behind.

The foundation for UPnP networking is IP addressing. Each device must have a DHCP client and search for a DHCP server when the device is first connected to the network. If a DHCP server is available, i.e., the network is managed, the device must use the IP addressed assigned to it. If no DHCP server is available, i.e., the network is unmanaged, the device must use Auto IP to get an address. In brief, Auto IP defines how a device intelligently chooses an IP address from a set of reserved addresses and is able to move easily between managed and unmanaged networks. If during the DHCP transaction, the device obtains a domain name, e.g., through a DNS server or via DNS forwarding, the device should use that name in subsequent network operations; otherwise, the device should use its IP address.

Given an IP address, the first step in UPnP networking is called "Discovery." When a device is added to the network, the UPnP discovery protocol allows that device to advertise its services to control points on the network. Similarly, when a control point is added to the network, the UPnP discovery protocol allows that control point to search for devices of interest on the network. The fundamental exchange in both cases is a discovery message containing a few, essential specifics about the device or one of its services, e.g., its type, identifier, and a pointer to more detailed information. The UPnP discovery protocol is based on the Simple Service Discovery Protocol (SSDP).

The second step in UPnP networking is called "Description." After a control point has discovered a device, the control point still knows very little about the device. For the control point to learn more about the device and its capabilities, or to interact with the device, the control point must retrieve the device's description from the Uniform Resource Locator (URL) provided by the device in the discovery message. Devices may contain other, logical devices, as well as functional units, or services. The UPnP description for a device is expressed in XML and includes vendor-specific, manufacturer information like the model name and number, serial number, manufacturer name, URLs to vendor-specific Web sites, etc. The description also includes a list of any embedded devices or services, as well as URLs for control, eventing, and presentation. For each service, the description includes a list of the commands, or actions, the service responds to, and parameters, or arguments, for each action. The description for a service also includes a list of variables. These variables model the state of the service at run time, and are described in terms of their data type, range, and event characteristics.

The third step in UPnP networking is called "control." After a control point has retrieved a description of the device, the control point can send actions to a device's service. To do this, a control point sends a suitable control message to the control URL for the service (provided in the device description). Control messages are also expressed in XML using the Simple Object Access Protocol (SOAP) and transmitted usually through HTTP. Like function calls, in response to the control message, the service returns any action-specific values. The effects of the action, if any, are modeled by changes in the variables that describe the run-time state of the service.

The fourth step in UPnP networking is called "eventing." A UPnP description for a service includes a list of actions the service responds to and a list of variables that model the state of the service at run time. The service publishes updates when these variables change, and a control point may subscribe to receive this information. The service publishes updates by sending event messages. Event messages contain the names of one of more state variables and the current value of those variables. These messages are also expressed in XML and formatted using the General Event Notification Architecture (GENA). A special initial event message is sent when a control point first subscribes; this event message contains the names and values for all evented variables and allows the subscriber to initialize its model of the state of the service. To support scenarios with multiple control points, eventing is designed to keep all control points equally informed about the effects of any action. Therefore, all subscribers are sent all event messages, during the period of subscription subscribers receive event messages for all evented variables that have changed, and event messages are sent no matter why the state variable changed (either in response to a requested action or because the state the service is modeling changed).

The fifth and final step defined for UPnP networking is called "presentation." If a device has a URL for presentation, then the control point can retrieve a page from this URL, load the page into a browser, and depending on the capabilities of the page, allow a user to control the device and/or view device status. The degree to which each of these can be accomplished depends on the specific capabilities of the presentation page and device.

Unfortunately, while this networking framework provides an adequate mechanism for the discovery, control, and presentation of UPnP devices, it does not provide a common user experience across all UPnP devices. That is, since each individual UPnP device manufacturer develops its own URL page for presentation and control, the user experience for each device will be different. Further, since each manufacturer's URL page is designed for only that particular UPnP device, there is no common mechanism for discovering and controlling all UPnP devices on a network. As a result, a user at a control point computer must make multiple connections with a browser to multiple presentation pages to view and control all of the UPnP devices available on the network. This significantly complicates the user experience, and detracts from the promise of ease of use envisioned by UPnP.

SUMMARY OF THE INVENTION

The instant invention discloses a generic UPnP tool (Generic User Control Point (UCP) Tool) that allows a user to discover, monitor, and control UPnP devices from various manufacturers on a network. In this way, the Generic UCP of the present invention presents a common user experience to UPnP networking heretofore unavailable across various manufacturers. The tool is preferably a Visual Basic (VB) application that uses the UPnP application programming interfaces (API's) in Windows Millennium (WinMe) and the Windows family of operating systems, although other implementations (e.g., c++, etc.) and operation with other operating systems are also envisioned.

In one embodiment, the usage of the tool is split into two phases namely, discovering the devices and controlling them. The first phase involves choosing the type of search needed and discovering the devices. Once the UPnP devices have been discovered, the user may then browse the properties of the devices found. The second phase involves choosing a particular service of a selected device and then controlling it. During this stage, the user may also watch the eventing happen for the evented state variables for that particular service. In a preferred embodiment, the user may also utilize the tool to perform a query on any variable of the selected service in the device and control the service through a known list of actions that are specified in the service schema.

The tool's user interface (UI) allows the user to choose a type of search to discover UPnP devices, either by type, by unique device name (UDN), or asynchronously, which is particularly useful when one wants to find all devices. Once the discovery process is started, the tool collects the information returned from the UPnP API in a pull-down list. A user may then select one of the UPnP devices from this pull-down list. Once selected, the tool provides the user with the option of displaying the properties of the device, including the services provided thereby. A service of the device may then be selected from a pull-down list (if more than one is available) on the tool. Once a particular service has been selected, the user may then undertake to invoke an action of the service by entering the action and any required arguments. The eventing of the device may be monitored by viewing an Events field on the tool. The tool also provides the ability to open the manufacturer's presentation URL for the device if the user so desires.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
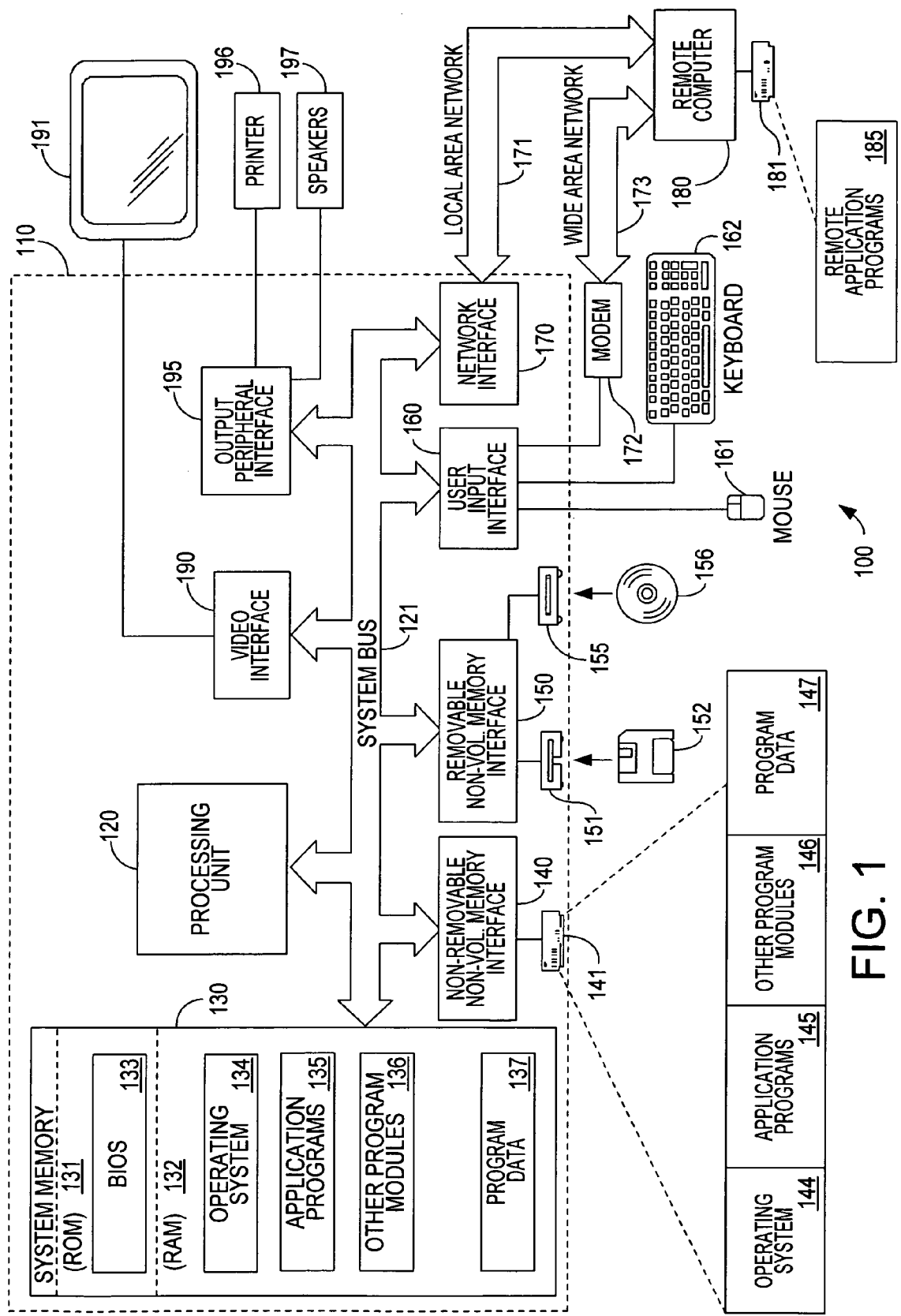
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. Additionally, and with particular application to the present invention, operation with UPnP devices in a networked environment with the computer 110 serving as a generic control point for the UPnP devices is also possible.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In one embodiment of the present invention operating in this environment, a generic user control point (UCP) for UPnP devices is presented as a user interface (UI) tool operable to (1) discover and (2) control UPnP devices that may be networked therewith. On such embodiment of an UI presenting the operability of the generic UCP tool of the present invention is illustrated in screen shot form in FIG. 2 to which attention is now directed. This tool is referred to as a generic UCP because it is capable of discovering and controlling all UPnP compliant devices from a single UI, regardless of the UPnP device type and/or manufacturer. As such, it presents a single user experience for all UPnP devices, thus enhancing a user's ability to fully utilize the features promised by UPnP.

Figure 2:
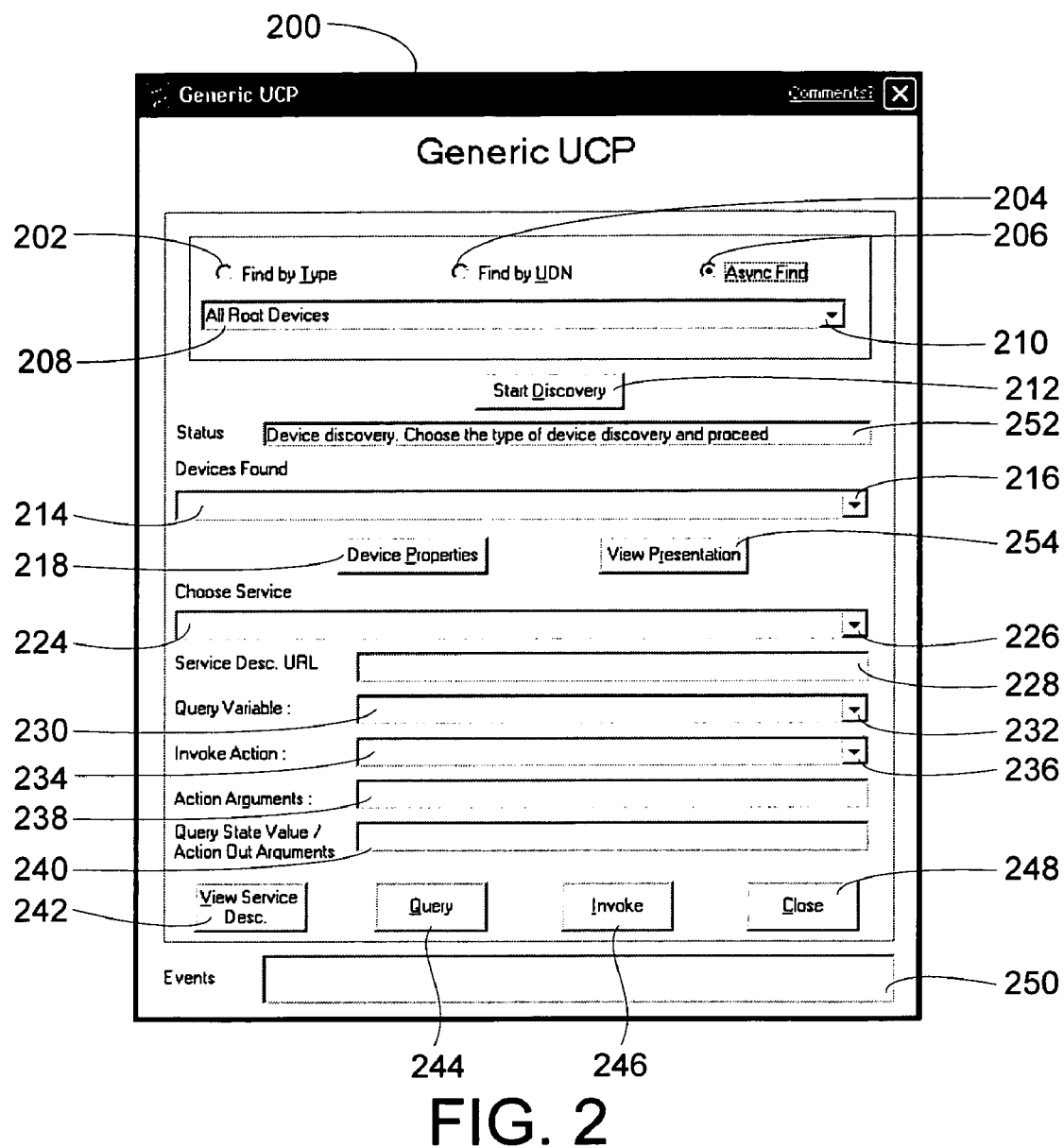
FIG. 2 is a screen shot illustration of a user interface (UI) of an embodiment of the generic user control point (UCP) of the present invention.

As may be seen from the exemplary generic UCP tool's UI 200 of FIG. 2 (shown as a Windows Millennium application window), three discovery options are provided to allow a user to discover UPnP devices on a network. These options, which may be selected by a simple mouse selection, include "Find by Type" 202, "Find by UDN" 204, and "Async Find" 206. To enable the "Find by Type" 202 and the "Async Find" 206 selections, the tool 200 utilizes a file that contains device information. Such a file may be named "devtype.txt" or other appropriate name. This file should contain the device information specified by UPnP and may be in the form:

upnp:rootdevice All Root Devices
urn:schemas-upnp-org:device.lighting.1×10 Lighting Devices A line in this file for each specific device type is added similarly as the second line above. The UPnP working group provides the definitions for the UPnP device schemas used in this file. To enable the "Find by UDN" 204 selection, the tool 200 utilizes a file that contains the UDN information for the UPnP devices. Such a file may be named "udn.txt" or other appropriate name. This file should contain the UDN information specified by the UPnP or the manufacturer, and may be in the form:
uuid:{7d50b574-4213-4b88-84d9-e5c9241fcb3a}

A line in this file for each specific device is added as above.

Once the type of discovery desired is selected by the user, the type of device to be found may be selected from a pull-down list in field 208, e.g. All Root Devices. For the Find by UDN option, the particular device UDNs will be listed in the pull down list for user selection. This pull down list is accessed in normal fashion via the arrow button 210. This arrow 210 is ghosted out for the Async Find option as all UPnP devices will be found using this option. The user may either do this or simply enter the data, e.g., upnp:rootdevice at the List Box below the buttons "Find by Type," "Find by UDN," and "Async Find."

Once the type of discovery and the type of devices to be discovered are selected, the user may select the Start Discovery button 212 to begin the discovery process by transmitting the standard UPnP multicast discovery message (for WAN connections, the Multicast support must be enabled). In response, all devices must respond if any of their embedded devices or services matches the search criteria in the discovery message (using the criteria selected above). All of the devices discovered are listed in a pull down list in the Devices Found field 214. This list is accessible via the pull down arrow button 216 in normal fashion. Once this process is complete, the first or discovery phase of operation is complete.

Figure 3:
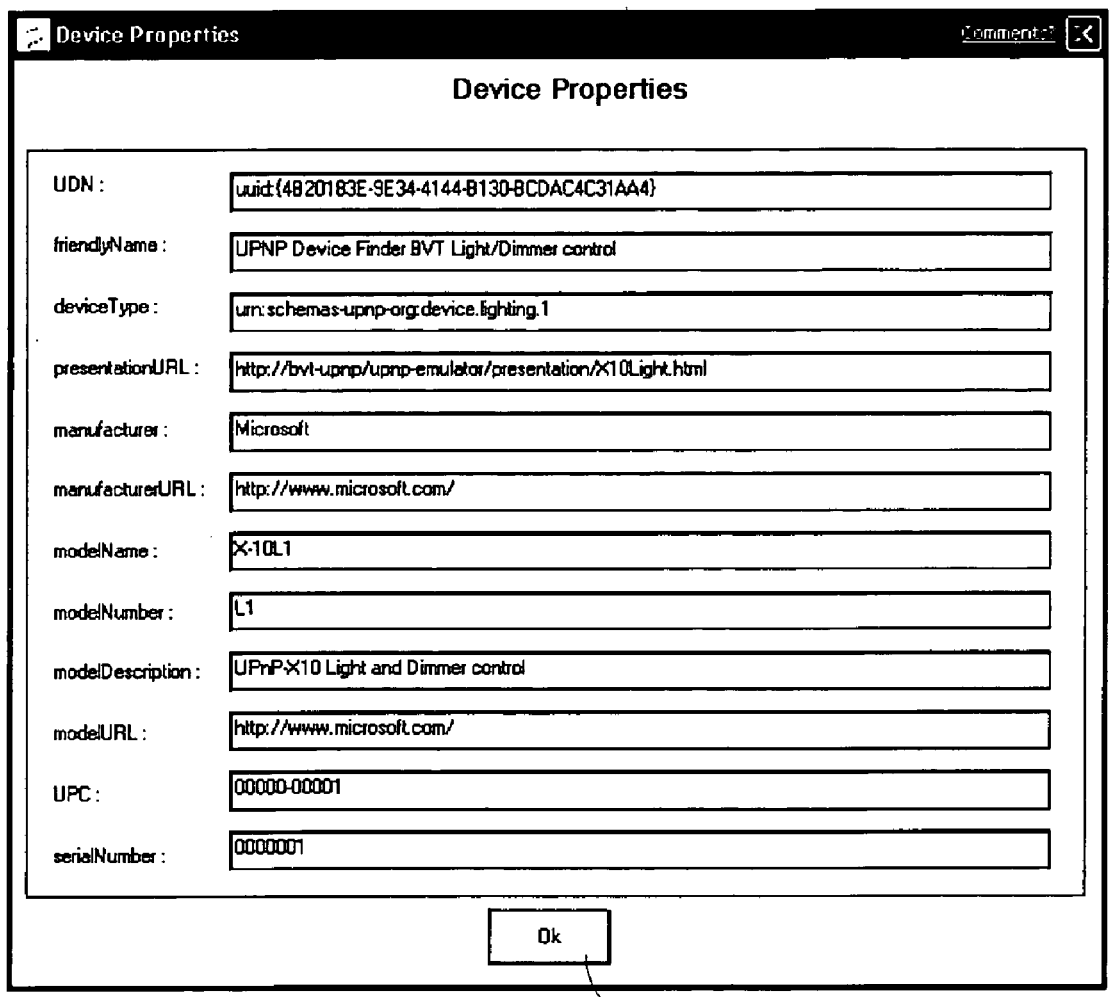
FIG. 3 is a screen shot illustration of a user interface (UI) display of a device properties page constructed in accordance with the teachings of the present invention.

The second phase of operation for the Generic UCP tool of the present invention is the Control phase. In this phase, a user selects a device to be controlled, may view its properties, may choose a service to invoke or check the status of state variable of the device. To begin this phase, a user selects a particular device from the pull down list discussed above. Once a particular discovered device has been selected by the user, its properties may be displayed by selecting the Device Properties button 218. In one embodiment of the invention, the device properties are displayed in a new Device Properties field 220, such as that illustrated in FIG. 3. This field preferably includes all of the information provided by the UPnP device discovery process, including, e.g., the device's UDN, its friendly name, device type, model name and number, the model description, the model URL, the UPC and serial number, any presentation URL provided by the device manufacturer, the manufacturer itself, the manufacturer's URL. After the desired information has been obtained, the user may simply select the OK button 222 to return to the Generic UCP tool UI 200 (of FIG. 2).

The services available for the selected device may be viewed in the Choose Service field 224 by selecting the pull down arrow button 226. The user may then select one of the services for the selected UPnP device from the pull down list. If information is available for the services of the device through, e.g., a service description document (SDD), the URL is provided in field 228 for the user's reference. If the user wishes to view the page, the View Service Desc. button 242 may be selected. Selection of this button 242 will open a separate window 256 illustrated in FIG. 4 through which one can browse the SDD.

Figure 4:
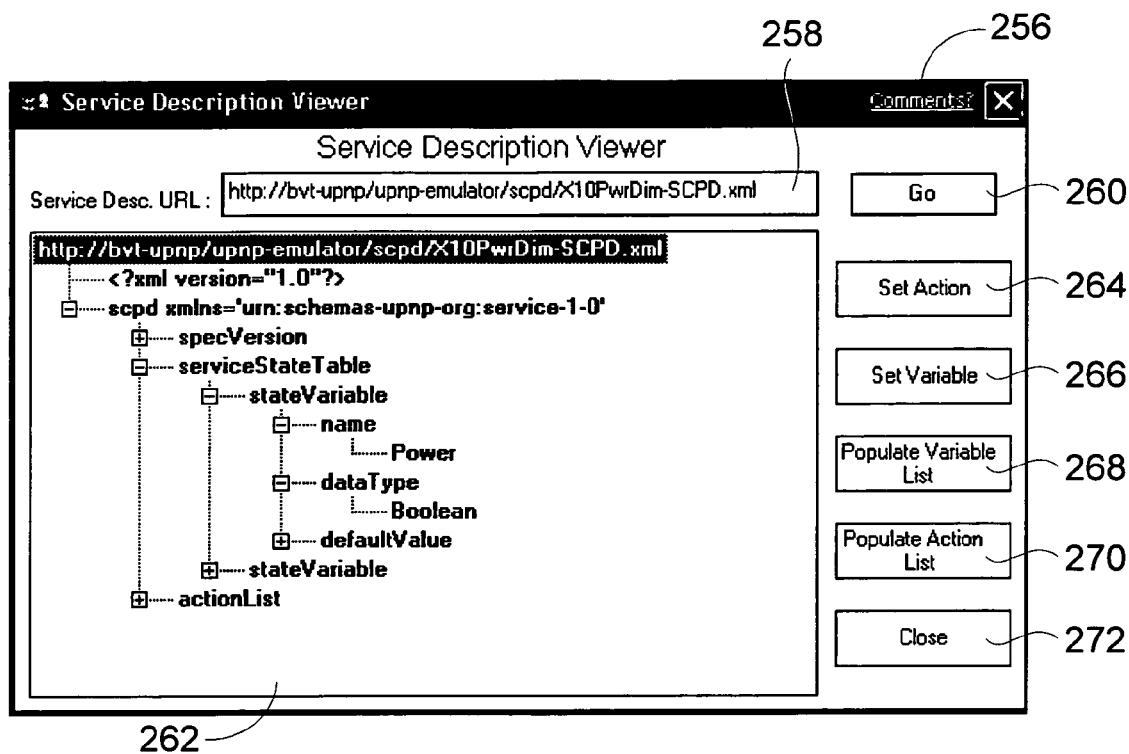
FIG. 4 is a screen shot illustration of a user interface (UI) display of a service description viewer page constructed in accordance with the teachings of the present invention.

As may be seen from an examination of this FIG. 4, the Service Description Viewer window 256 provides a listing of the SDD URL in field 258. Upon selection of the Go button 260, the SDD is retrieved and illustrated in display window 262. The exemplary SDD illustrated in display window 262 is presented in an expandable tree structure as is well known in the art. However, other display formats for the SDD may also be displayed. Through this Service Description Viewer window 256, the user may set selected actions via button 264 and variables via button 266 for the UPnP device. The user may also choose to populate the variable list via button 268 and the action list via button 270. To return to the Generic UCP tool window 200, the user may simply select the close button 272.

Returning now to FIG. 2, if the user wants to query the value of any state variable of the selected service, the name of that variable may be selected from a pull down list of such variables in field 230. This pull down list is accessed by pull down arrow button 232. Once a state variable is selected, the Query button 244 may be selected to determine its value. The output of this query is returned to the Generic UCP tool of the present invention is presented in field 240. Likewise, if a user wants to invoke an action for the selected service, the action name may be selected from a pull down list of available actions in field 234. This pull down list is accessed by pull down arrow button 236. Once an action is selected, its arguments are entered in field 238, and the Invoke button 246 may be selected to invoke that action. The results are shown in the field 240.

The UPnP device's eventing information is shown in field 250. The Status field 252 provides status information for the Generic UCP tool itself to aid a user in the utilization of the tool. When the user is done using the tool of the present invention, the user may select the close button 248.

The UCP tool also provides the user the opportunity to utilize the presentation UI (if any) designed by the UPnP device manufacture. If a device has a URL for presentation, then the UCP tool can retrieve a page from this URL, load the page into a browser, and depending on the capabilities of the page, allow a user to control the device and/or view device status. The degree to which each of these can be accomplished depends on the specific capabilities of the presentation page and device. This is accomplished in the exemplary embodiment of FIG. 2 through the selection of the View Presentation button 254. Once this button is selected, a web browser, such as Internet Explorer, is opened by the UCP tool. The browser opens the presentation page from the manufacturer by directing the browser to the presentation page's URL. Full functionality provided by this presentation page is available to the user through the browser opened by the UCP tool.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A generic user control point tool for discovering, controlling, and displaying Universal Plug and Play (UPnP) devices on a system, the generic user control point tool comprising:
    a user interface that displays, in a first window panel:
        a plurality of user-selectable device search fields corresponding to a plurality of alternate types of searches for discovering UPnP devices on the system, wherein each of the user-selectable device search fields corresponds to one of the alternate types of searches for discovering UPnP devices on the system;
        a device properties search field displaying to the user a plurality of user-selectable UPnP device properties, wherein the user-selectable UPnP device properties are determined and displayed by the user interface in response to user selection of one of the user-selectable device search fields, and wherein the user interface determines the UPnP device properties by utilizing at least one file containing device property information, the at least one file corresponding to the user-selected device search field;
        wherein in response to user-selection of one of the user-selectable device search fields and one of the user-selectable UPnP device properties, the generic user control point tool collects UPnP device information that is displayed as a list of selectable UPnP devices at the first window panel of the user interface.

2. A generic user control point tool as recited in claim 1, wherein the selectable device search fields include a find by type search option for searching by type of UPnP device, a find by unique device name (UDN) search option for finding UPnP devices by unique name and an asynchronous search option for finding all UPnP compliant devices on the system.

3. A generic user control point tool as recited in claim 1, wherein the user interface further displays a start discovery button that must be selected prior to initiating discovery according to the user-selected device search field and the user-selected UPnP device property.

4. A generic user control point tool as recited in claim 1, wherein the generic user control point tool collects UPnP device information in response to sending a multicast discovery message to UPnP devices that the UPnP devices respond to when any embedded devices or services of the UPnP devices match search criteria included in the multicast discovery message.

5. A generic user control point tool as recited in claim 1, wherein the selectable list of UPnP devices is displayed in a pull-down list.

6. A generic user control point tool as recited in claim 1, wherein the user interface displays a presentation button that, when selected, causes the user interface to access and load a browser and then to access and load a UPnP device manufacture's presentation user interface with the browser according to a URL of a UPnP device selected from the list of selectable UPnP devices.

7. A generic user control point tool as recited in claim 1, wherein at least one of the alternate types of searches for discovering UPnP devices is a search by device type, and wherein in response to user selection of the user-selectable device search field corresponding to the search by device type, the device properties search fields includes a selectable list of device types for discovering UPnP devices on the system.

8. A generic user control point tool as recited in claim 1, wherein at least one of the alternate types of searches for discovering UPnP devices is a search by device identification number, and wherein in response to user selection of the user-selectable device search field corresponding to the search by device identification number, the device properties search field includes a selectable list of device identification numbers for discovering UPnP devices on the system.

9. A generic user control point tool as recited in claim 1, wherein at least one of the alternate types of searches for discovering UPnP devices is an asynchronous search, and wherein in response to user selection of the user-selectable device search field corresponding to the asynchronous search, the device properties search field is disabled.

10. A generic user control point tool as recited in claim 1, wherein the user interface also displays a selectable properties button corresponding to properties of the selectable UPnP devices, and wherein the generic user control point tool automatically obtains and displays properties corresponding to a selected UPnP device when the selected UPnP device is selected from the list and when the selectable properties button is selected.

11. A generic user control point tool as recited in claim 10, wherein the generic user control point tool displays the properties corresponding to the selected UPnP device in a separate window from the first window.

12. A generic user control point tool as recited in claim 10, wherein the user interface also displays a list of services available to the selected UPnP device, when the selectable properties button is selected, and wherein the user interface displays a URL to a service description document in a field of the user interface when information is available for the services of the selected UPnP device in the service description document.

13. A generic user control point tool as recited in claim 12, wherein the user interface also displays a selectable view service description button that, when selected, causes the generic user control point tool to open a service description viewer window for browsing the service description document, the service description viewer window being different than the first window panel used to display the user interface.

14. A generic user control point tool as recited in claim 13, wherein the service description viewer window displays a selectable button, that when selected causes the generic user control point tool to display the service description document.

15. A generic user control point tool as recited in claim 12, wherein the user interface displays a query button that, when selected, causes the user interface to determine and display a value associated with a selected variable corresponding to a service selected from the list of services.

16. A generic user control point tool as recited in claim 15, wherein the user interface displays a selectable list of variables from which the selected variable is selected.

17. A generic user control point tool as recited in claim 12, wherein the user interface displays an invoke action button that, when selected, causes the user interface to invoke a selected action for a service selected from the list of services.

18. A generic user control point tool as recited in claim 17, wherein the user interface displays a selectable list of actions that can be invoked and from which the selected action is selected.

19. A generic user control point tool as recited in claim 18, wherein the user interface includes a field that displays arguments corresponding to the selected action.

20. A method for discovering, controlling, and displaying Universal Plug and Play (UPnP) devices on a system using a generic user control point tool, the method comprising:
displaying a user interface with the generic user control point tool in a first window panel;
displaying at the user interface:
a plurality of user-selectable device search fields corresponding to a plurality of alternate types of searches for discovering UPnP devices on the system, wherein each of the user-selectable device search fields corresponds to one of the alternate types of searches for discovering UPnP devices on the system;
a device properties search field displaying to the user a plurality of user-selectable UPnP device properties, wherein the user-selectable UPnP device properties are determined and displayed by the user interface in response to user selection of one of the user-selectable device search fields, and wherein the user interface determines the UPnP device properties by utilizing at least one file containing device property information, the at least one file corresponding to the user-selected device search field;
in response to user-selection of one of the user-selectable device search fields and one of the user-selectable UPnP device properties, collecting UPnP device information corresponding to compliant UPnP devices on the system; and
displaying the compliant UPnP devices in a selectable list at the first window panel of the user interface.

21. A method as recited in claim 20, wherein the selectable device search fields include a find by type search option for searching by type of UPnP device, a find by unique device name (UDN) search option for finding UPnP devices by unique name and an asynchronous search option for finding all UPnP compliant devices on the system.

22. A method as recited in claim 20, wherein collecting UPnP device information includes sending a multicast discovery message to UPnP devices with search criteria.

23. A method as recited in claim 22, wherein compliant UPnP devices on the system respond to the multicast message when embedded devices or services of the compliant UPnP devices match the search criteria included in the multicast discovery message.

24. A method as recited in claim 20, further comprising:
displaying a presentation button; and
in response to user selection of the presentation button, performing the following:
accessing and loading a browser; and
accessing and loading a UPnP device manufacture's presentation user interface with the browser according to a URL of a UPnP device selected from the list of selectable UPnP devices.

25. A method as recited in claim 20, further comprising:
displaying a selectable properties button, at the user interface, corresponding to properties of UPnP devices; and
automatically displaying properties corresponding to a selected UPnP device when the selected UPnP device is selected from the list and when the selectable properties button is selected.

26. A method as recited in claim 25, wherein the properties corresponding to the selected UPnP device are displayed in a separate window from the first window.

27. A method as recited in claim 25, further comprising:
displaying a list of services available to the selected UPnP device, when the selectable properties button is selected, and
displaying a URL to a service description document when information is available for the services of the selected UPnP device in the service description document.

28. A method as recited in claim 27, further comprising:
displaying a selectable view service description button that, when selected, causes the generic user control point tool to open a service description viewer window for browsing the service description document, the service description viewer window being different than the first window panel used to display the user interface.

29. A method as recited in claim 27, further comprising:
displaying a query button that, when selected, causes the user interface to determine and display a value associated with a selected variable corresponding to a service selected from the list of services, and
displaying a selectable list of variables from which the selected variable is selected.

30. A method as recited in claim 27, further comprising:
displaying an invoke action button;
displaying a selectable list of actions corresponding to a service selected from the list of services; and
invoking a selected action in response to user input selecting one of the actions and the invoke action button.

31. A method as recited in claim 30; further comprising displaying, at the user interface, arguments corresponding to the selected action.

* * * * *